March 19, 1957  C. L. GARRISON  2,785,510
APPARATUS FOR GRINDING DRILLS
Filed Aug. 13, 1952  3 Sheets-Sheet 3
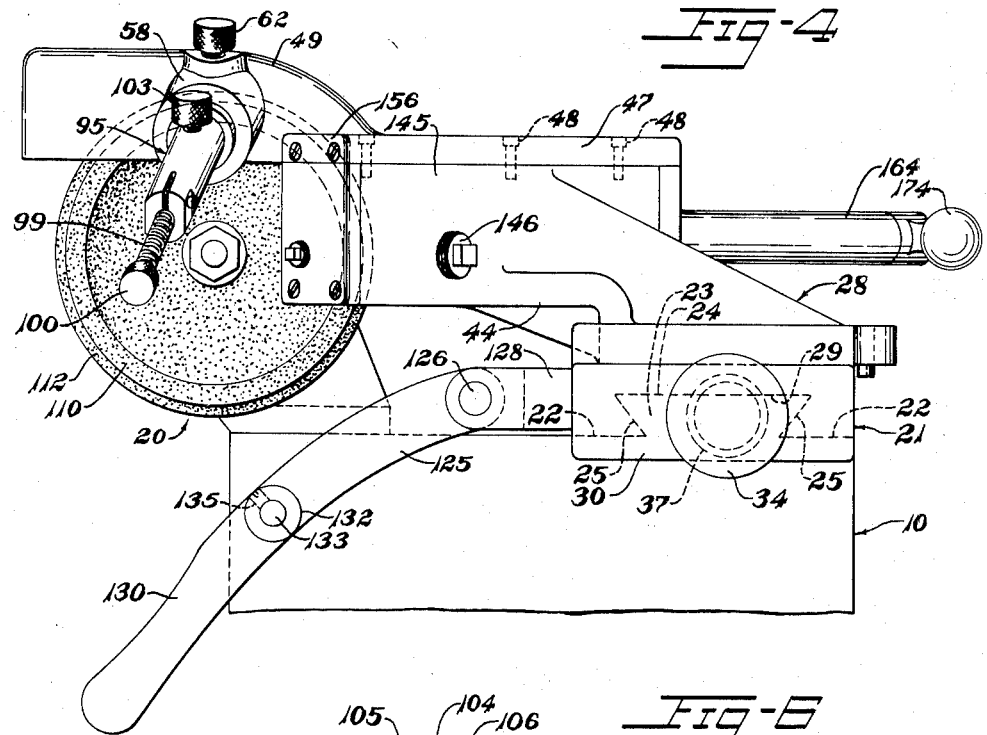
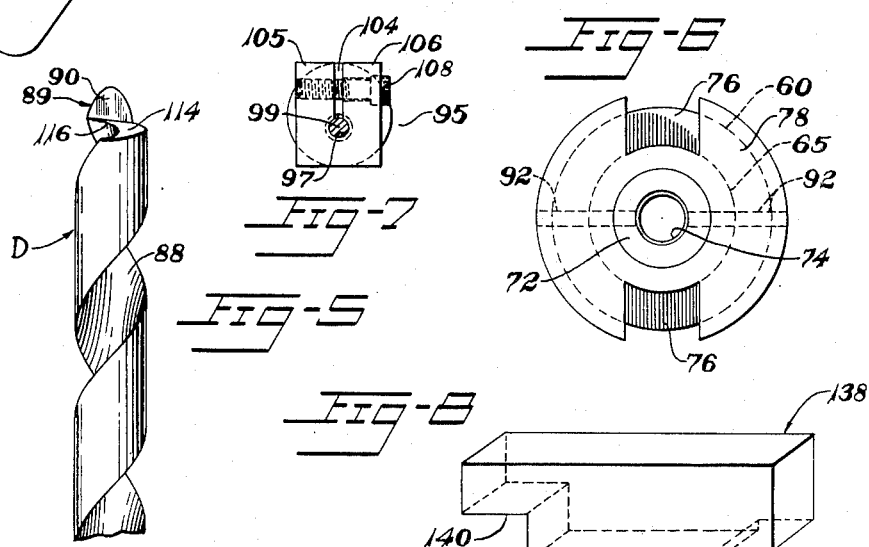
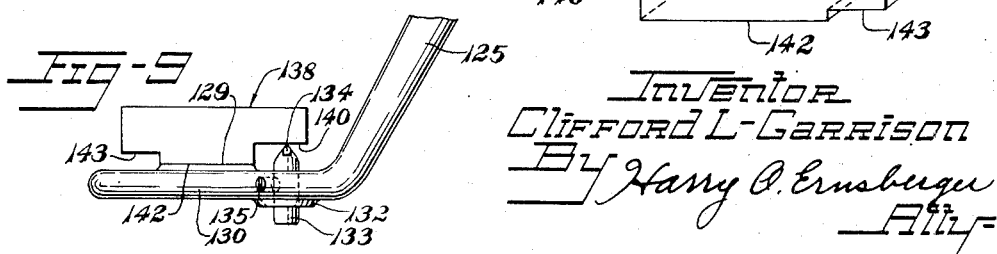
Inventor
Clifford L. Garrison
By Harry O. Ernsberger
Atty.

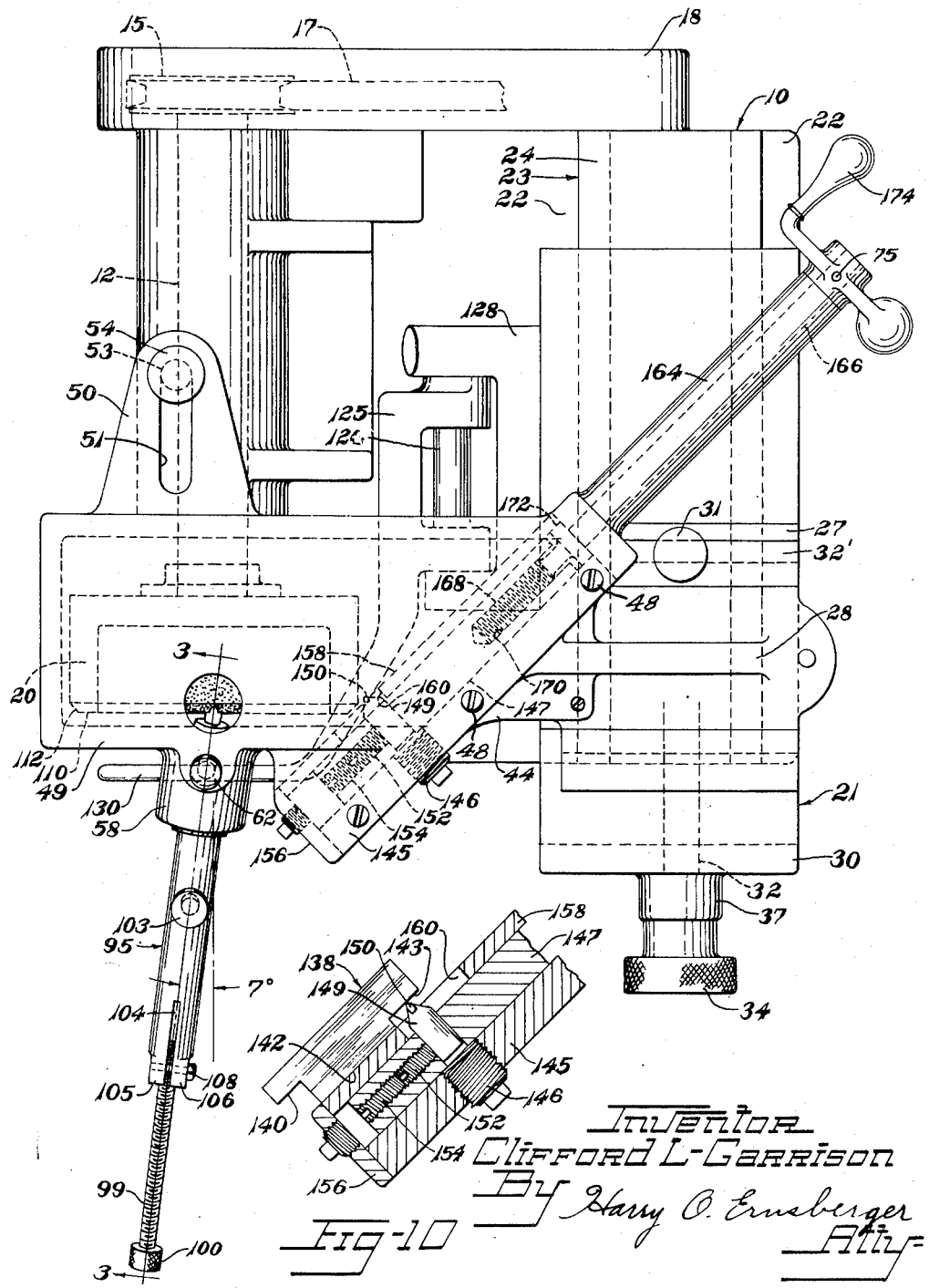

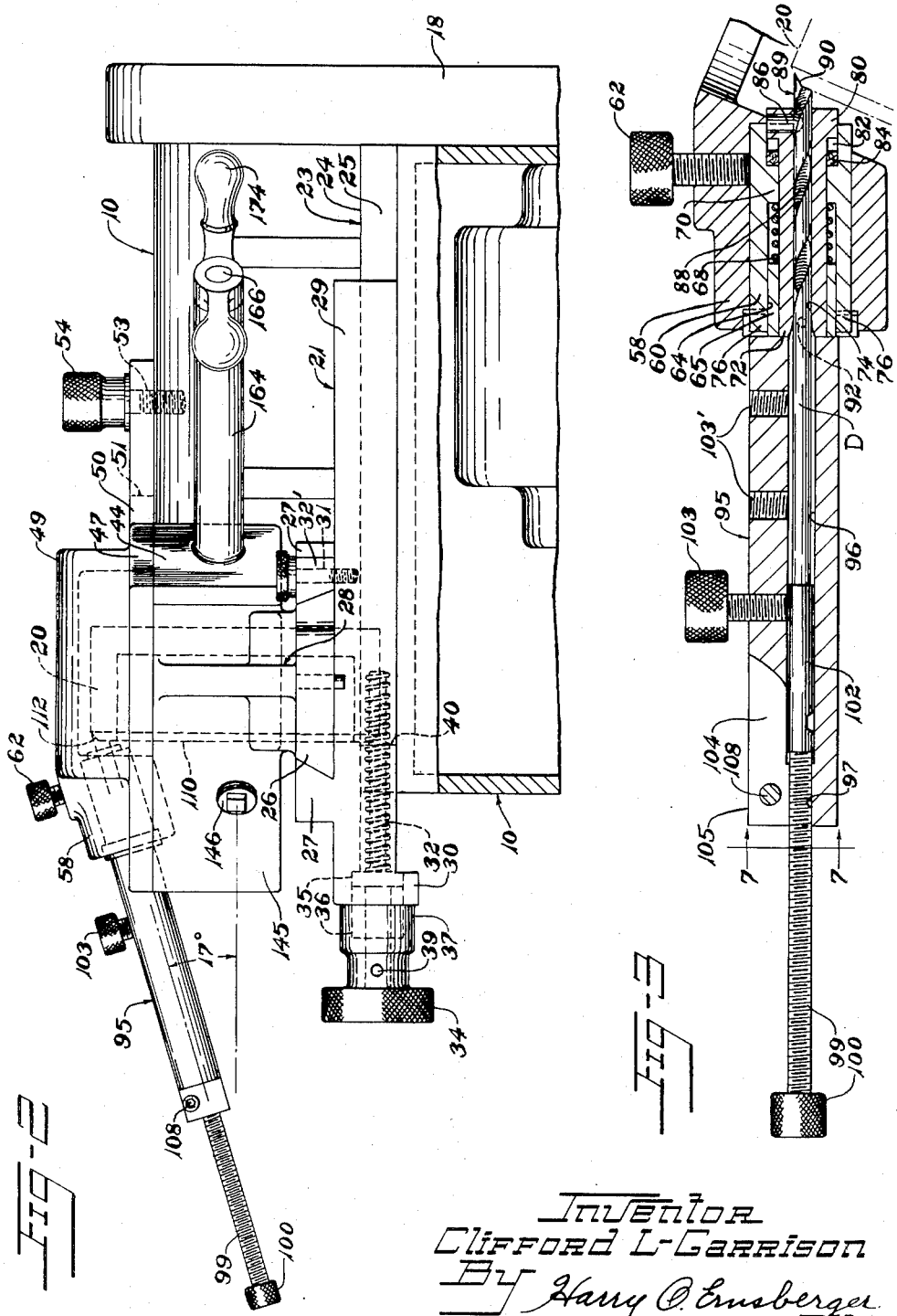

United States Patent Office 2,785,510
Patented Mar. 19, 1957

2,785,510

APPARATUS FOR GRINDING DRILLS

Clifford L. Garrison, Adrian, Mich., assignor to Oliver Instrument Company, Adrian, Mich., a corporation of Michigan Application August 13, 1952, Serial No. 304,154

8 Claims. (Cl. 51—5)

This invention relates to grinding apparatus and more especially to an apparatus for sharpening or conditioning drills.

In the manufacture of acoustic tile and certain types of insulating blocks, especially those formed of nonmetallic fibrous materials and materials such as perlite, vermiculite and the like, the tiles or blocks are perforated or provided with a comparatively large number of small openings to facilitate sound attenuation. Openings are also provided to receive securing screws or other fastening means for holding the tiles or blocks in installed positions. Due to the fibrous or porous nature of acoustic tiles or blocks, drills have been developed especially adapted for rapidly forming the small openings in the tiles, the drills being of a character especially configurated for producing clean-cut, smooth bores in the tile without tearing the adjacent fibers. Such drills do not embody a conventional spiral cutting configuration but are formed with a cutting edge spaced radially from the longitudinal axis of the drill, such cutting configuration being formed as an axial extension of the cylindrical periphery of the drill. Up to the present time, no satisfactory means has been found for uniformly conditioning, sharpening or resharpening drills of this character.

The present invention contemplates a novel apparatus for grinding or sharpening a drill of a character having a peripherally arranged, axially extending cutting portion wherein the drills may be quickly ground, sharpened or resharpened in a uniform pattern and wherein the grinding operation maintains each drill at a predetermined length so that a large number of drills may be sharpened at one operation to a uniform length.

Another object of the invention is the provision of a fixture applicable to a grinding machine for configurating and sharpening the end structure of drills or boring devices having an axially extending peripheral cutting portion.

Another object of the invention resides in the provision of a drill-sharpening or drill-configurating fixture wherein the drill is adapted to be inserted in and removed from a guiding sleeve without the use of special tools whereby drills may be configurated or resharpened in a comparatively short time.

Another object of the invention is the provision of a fixture for grinding drills having peripherally disposed cutting surfaces which is equipped with a drill-guiding means for directing the drills into abrading contact with a grinding wheel in a manner whereby the drills may be ground to uniform dimensions, specifications and lengths and wherein the grinding operations may be carried on without the use of drill-clamping devices.

Another object is the provision of a fixture for sharpening or configurating drills embodying adjustable means for accommodating drills of varying lengths, the arrangement including a movable drill guide and abutment means for predetermining the extent of movement of the drill into engagement with the grinding wheel.

Still another object of the invention is the provision of a drill-supporting fixture embodying efficient and effective means for contouring, dressing or truing the operative surfaces of the grinding wheel when the same become worn through extended use.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a top plan view of a portion of a grinding machine showing a form of drill-grinding fixture of my invention associated therewith;

Figure 2 is an elevational view of the structure shown in Figure 1;

Figure 3 is a sectional view taken substantially on the line 3—3 of Figure 1;

Figure 4 is a front elevational view of the structure shown in Figure 1;

Figure 5 is a view illustrating a portion of a drill of the character supported by the fixture of the invention;

Figure 6 is a front view of the drill guide structure;

Figure 7 is a view taken on the line 7—7 of Figure 3;

Figure 8 is an isometric view of a gauge means for predetermining the position of the wheel-truing or contouring means;

Figure 9 is a fragmentary plan view of a grinding wheel dressing means for conditioning a planar face of the wheel, and Figure 10 is a fragmentary sectional view of a grinding wheel dressing means for conditioning a chamfered zone of the wheel.

While I have illustrated a form of fixture of my invention especially usable for configurating or sharpening the operative or cutting portion of a drill having an axially extending peripheral cutting zone, it is to be understood that I contemplate the use of the apparatus of the invention for configurating other types of drills or boring devices wherever the same may be found to have utility.

Referring to the drawings in detail and first with respect to Figures 1 and 2, there is illustrated a portion of a grinding machine frame 10 within the upper portion of which is journaled an arbor or shaft 12 mounted in suitable antifriction bearings (not shown). The shaft 12 is provided with a pulley 15 driven by a belt 17 enclosed within a sheet metal casing 18. The driving means or belt 17 is driven by a motor (not shown) mounted in the base of the grinding machine frame. The shaft 12 supports a grinding wheel 20 which is preferably of cup shape although other types of grinding wheels may be employed if desired. The grinding machine frame 10 is formed with planar surfaces 22 and a tang 23 having an upper surface 24 and angularly disposed surfaces 25. The angularly disposed surfaces 25 form ways for supporting a carriage 21 upon which is mounted the fixture of the present invention.

The carriage 21 is provided with a portion 29 configurated to be supported upon the surfaces 22 and guided by surfaces 25 and slidable along the surfaces in order to adjust the position of the fixture with respect to the grinding wheel 20. The carriage is provided with a depending flange portion 30 which is bored to accommodate a threaded shaft 32 having a tenon portion at one end which is equipped with a knurled manipulating knob 34.

The shaft is integrally formed with a flange or collar portion 35 which bears against a bearing sleeve 36 mounted within the boss portion 37 integrally formed on the flange portion 30. The manipulating knob 34 is secured to the shaft by means of a pin 39. Through this form of mounting, the shaft 32 may be rotated relative to the flange portion 30, the threaded portion of the shaft cooperating with a threaded bushing or nut 40 fixedly mounted in a bore in the tang 23 providing means whereby the carriage may be moved along the ways. The fixture is supported upon the carriage 21 and may be moved relative to the grinding machine frame and the grinding wheel in order to secure an adjustment of the drill-carrying means with respect to the grinding wheel. The structure 28 is formed with a tang 26 which extends at right angles to the tang 23 and is contained between portions 27 formed on the carriage. A retaining member 32' cooperates with tang 26 and a locking screw 31 to secure the fixture frame structure 28 to the carriage 21.

The fixture includes a frame 28 which is provided with a projecting portion 44 which supports a member 47 secured to the portion 44 by means of screws 48. The member 47 is provided with a raised hollow portion 49 which forms a partial shroud or guard for the grinding wheel 20 and a means for supporting a drill holder. The shield or guard portion 49 is formed with an integral, rearwardly extending projection 50 provided with a slot 51. The slot 51 accommodates a securing screw 53 threaded into an opening in the grinding machine frame, the screw 53 having a knurled head 54 for ease of manipulation.

The guard portion 49 is also formed with an integral, forwardly extending boss portion 58 which is bored to receive a sleeve or bushing member 60. The sleeve is dimensioned to be snugly fitted into the bore and may be locked in position by means of a knurled headed screw 62. The sleeve 60 is formed with a counterbore 64 in which is disposed a collar 65. Disposed in the counterbore between an inwardly extending flange 70 and the collar is an expansive coil spring 68. The inner diameters of the flange 70 and the collar 65 are of a size to slidably receive a drill-guiding sleeve or element 72. The hollow interior or bore 74 of the guide 72 is of a dimension to slidably accommodate a drill D which is to be ground or sharpened by engagement with the grinding wheel 20.

The bushing 60 is provided with a pair of forwardly extending projections 76 adapted to extend into slots or recesses in a circular flange 78 formed integrally with the collar 65. The projections 76 in the slots in the flange 78 form a means for maintaining the collar 65 and guide sleeve 72 in proper relation with respect to the relatively fixed bushing 60 yet permit longitudinal slidable movement of the guide 72 and collar 65 relative to the bushing. This is to facilitate the operation of bringing the point of the drill into proper engagement with the grinding wheel.

The end of the drill guide sleeve 72 adjacent the grinding wheel 20 is formed with an enlarged head or flange portion 80 which is of a dimension to be slidably received in a second counterbore 82 formed in the sleeve 60. Also disposed in the counterbore 82 is an annular sealing means 84, which may be of suitable material such as felt or the like, to prevent abraded particles resulting from grinding operations from moving along the surfaces of the bushing 60, the guide sleeve 72 and the collar 65.

It should be noted, as shown in Figure 3, that the space 82 is only partially occupied by the annular seal 84. The drill guide 72 is thus arranged for relative longitudinal movement to the extent permitted by the length of the chamber 82 not occupied by the seal 84. A means is provided adapted for cooperation with a drill to be ground whereby the operative cutting portion of the drill is brought into relation with the grinding wheel. As shown in Figure 3, the flange or head portion 80 of the guide sleeve 72 is provided with a transversely extending pin 86 having a portion extending inwardly of the bore or interior of the guide sleeve 72 and adapted to extend into the spiral groove 88 of the drill construction D so that the operative cutting portion or point 89 is brought into the correct engagement with the grinding wheel to effect the proper abrading and contouring of the drill to secure a cutting configuration most efficient for satisfactory drilling purposes in fibrous materials.

The collar 65 and the guide sleeve 72 are secured together by means of pins 92 so that the collar 65 is secured to the guide sleeve 72 to move therewith relative to the bushing or sleeve 60.

A drill-holding means is provided for facilitating the operation of bringing a drill into engagement with the grinding wheel through the cooperation of the drill guide 72. The drill holder includes an elongated member 95 having a bore 96 extending through a portion of the length of the member. The outer end portion of member 95 is formed with a threaded opening 97 of lesser diameter than the bore 96 and is adapted to accommodate a threaded member 99 having a manipulating knob 100, the member 99 serving as a drill-positioning means. As illustrated in Figure 3, the drill D has a shank portion 102 which is of slightly greater diameter than the remainder of the drill body, and the bore 96 is of a dimension to snugly yet slidably accommodate the enlarged shank section 102 of the drill.

The threaded member 99 serves as an abutment to define the position of a drill D with respect to the holder 95, the guide sleeve 72 and the grinding wheel 20. As the drills are used they become worn down, and by manipulation of the screw 99, the position of a drill in the holder 95 may be varied or changed to carry on successive drill-grinding or sharpening operations.

Means is provided for locking the drill-positioning member 99 in adjusted position. As shown in Figure 7, the extremity of the holder 95 is provided with a slot 104 extending from the threaded bore 97 to the exterior of the holder forming thereby spaced portions 105 and 106. Portion 105 is formed with a threaded opening and portion 106 is provided with an unthreaded opening in alignment with the threaded opening in portion 105 to accommodate a clamping screw 108. The portions 105 and 106 are sufficiently resilient to be drawn together by the screw 108 and frictionally lock the threaded member 99 in adjusted position. By this means, a number of drills may be resharpened or ground at one setting of the abutment or member 99 whereby the sharpened drills will be of a uniform length.

The operative or cutting edge portion 89 of the drill is ground to proper configuration by engaging the end of the drill with two surfaces of the grinding wheel 20. The grinding wheel is therefore provided with a planar front surface 110 and a chamfered peripheral surface 112. The surface 110 abrades the drill D to form the surface 114 as shown in Figure 5 while the chamfered surface 112 of the grinding wheel forms the surface 90 on the drill.

It should be noted in Figure 1 that the axis of the guide sleeve 72 and holder 95 is angularly arranged or inclined about 7° with respect to a vertical plane through the axis of the grinding wheel. This angularity is desirable in order to provide a relief angle for the drill surface 90 of the cutting configuration of the drill so that a high cutting efficiency for the drill may be attained. With reference to Figure 2, it should be noted that the axis of the guide sleeve 72 and holder 95 is also inclined upwardly with respect to the axis of the grinding wheel at an angle of about 17°. It is to be understood that other angularities for drill surfaces 90 and 114 may be employed by forming the boss 58 at different angles with respect to the axis of the grinding wheel. From examination of Figure 5, this inclination of surface 114 provides a curved edge 116 at the intersection of surface 114 with the spiral groove in the drill and serves to assist in removing the material cut away by portion 89 during drilling operations.

Means are provided for dressing or contouring the front planar face 110 of the grinding wheel and the chamfered surface 112 thereof. The means for dressing the uniplanar surface of the wheel is inclusive of an arm or member 125 which is journaled upon a stub shaft 126 carried in projections 128 integrally formed on the carriage 21. The arm 125 has a handle portion 130 formed with a boss 132 within which is mounted a member 133 equipped with a grinding wheel dressing member or diamond 134. The diamond-supporting member 133 is held in position by means of a locking screw 135.

As shown in Figure 9, the handle portion 130 of arm 125 is provided with a gauging surface 129 arranged to cooperate with a gauge block 138 (shown in Figure 8) for adjusting the position of diamond holder 133 in order to properly dress the planar surface 110 of the grinding wheel. The holder 133 is adjusted to bring the tip of the truing diamond into contact with the gauging surface 140 of gauge block 138. The arm 125 may be oscillated about the axis of its supporting shaft 126 to bring the truing diamond into engagement with the face 110 of the grinding wheel for truing the surface, and the oscillation continued until the truing diamond has abraded the face of the wheel to prepare the surface 110 for drill-grinding operations.

The means for dressing the chamfered surface 112 of the wheel is mounted directly upon the fixture frame 28. The frame 28 is integrally formed with an elongated portion 145 disposed at an angle of about 45° with respect to the axis of rotation of the grinding wheel. The portion 145 is formed with a longitudinally extending recess in which is disposed a bar or member 147 of rectangular cross-section to fit snugly yet slidably in the recess. The member 147 is provided with a bore in which is disposed a cylindrical member 149 provided with a wheel-truing diamond 150. The bar 147 is formed with an axially disposed threaded bore adjacent one end adapted to receive an element 152, preferably of soft metal such as brass, in direct engagement with the diamond holder 149, the element 152 being locked in engagement with the holder 149 by means of a locking screw 154. The end of portion 145 is closed by means of a suitable plate 156.

The recess accommodating the slidable bar 147 is covered by means of a plate 158 held in place by suitable screws (not shown). The plate 158 is formed with a slot 160 through which extends the holder 149 and wheel-truing diamond 150. The slot 160 is elongated in the direction of elongation of the bar 147 to facilitate reciprocable movement of the bar 147 to move the diamond 150 across the chamfered surface 112 of the grinding wheel for dressing or truing the same.

Means is provided reciprocating the bar 147 longitudinally to effect movement of the truing diamond across the face 112 of the grinding wheel. The portion 145 is formed with an extending shank 164 which is bored to accommodate a shaft 166. The shaft is formed at one end with a threaded member 168 threaded into a threaded bore 170 formed in the bar 147. The shaft 166 is also formed with a collar 172 which abuts the upper end of the recess formed in portion 145. The outer end of shaft 166 supports a manipulating crank or member 174 held to the shaft by means of a pin 75. The collar 172 and the crank member 174 eliminate longitudinal movement of the shaft 166 relative to the shank 164. By rotating the manipulating member 174 and shaft 166, the latter may be threaded into or away from the bar 147 causing longitudinal movement of the bar and the truing diamond 150. Thus by rotating the shaft 166 alternately in opposite directions, the truing diamond 150 is moved across and into engagement with the chamfered surface 112 of the grinding wheel to condition the surface for grinding operations. Movement of the diamond is continued until abrasion of the wheel surface 112 ceases.

The gauge block 138 may be employed to properly position the truing diamond 150 in order to carry out a truing operation upon the wheel surface 112. By placing the surface 142 of gauge block 138 against the outer surface of plate 158, as shown in Figure 10, the holder 149 is adjusted to engage the diamond 150 with the gauging surface 143, hence determining the position of the diamond to dress the wheel surface 112. Access to the truing-diamond holder 149 for purposes of adjustment is had by removing the plug 146 threaded into an opening in portion 145.

From the foregoing it will be seen that the grinding wheel dressing or truing means for both operative grinding surfaces or zones of the wheel are supported so as to be movable with the carriage 21. Through the use of the gauge block 138, the dressing diamonds 134 and 150 may be brought into operative engagement with the grinding wheel surfaces with a single adjustment of the carriage 21. After the wheel surfaces have been dressed, no further adjustment of the carriage is necessary during repeated drill-grinding or sharpening operations until the grinding surfaces become worn and require redressing. By this method, the proper relation of the grinding zones or surfaces may be readily achieved and maintained.

The fixture of my invention is especially adapted for grinding drill structures of the character shown in Figure 5, the grinding operations being carried on in the following manner. Assuming that the grinding wheel surfaces 110 and 112 have been brought to proper grinding relation through the use of the wheel-dressing means in the manner hereinbefore described, the operator inserts a drill D into the holder 95 when the latter is separated from the guide sleeve 72. The operator releases the locking screw 108 and rotates the threaded member 99 to the proper position to abut the rear end of a drill D. The abutment screw 99 is adjusted so as to permit the drill to move into engagement with the grinding wheel an amount sufficient to configurate or resharpen the operative or cutting end structure of the drill. After proper adjustment of threaded member 99 is attained, it is locked in adjusted position by drawing up the screw 108 contacting the portions 105 and 106 into clamping engagement with the threaded member 99. The drill D may be temporarily held in the holder 95 during grinding operations by manipulating the locking screw 103. The operator then inserts the spiral portion of the drill D through the guide sleeve 72, the pin 86 being received in the spiral recess or groove 88 of the drill. The function of the pin 86 is to cause the drill D to be positioned whereby the projection 89 of the drill is properly positioned with respect to the grinding faces of the wheel to properly regrind or sharpen the cutting edge.

It should be noted that the coil spring 68 normally biases the guide sleeve 72 to a position away from the wheel 20, the limit of movement of the guide sleeve 72 in this direction being determined by engagement of the flange or head 80 with the felt sealing ring 84. When the operator inserts the drill D into the guide sleeve 72 and the end of the drill holder 95 contacts the outer face of the flange portion 78 formed on the collar 65, the extremity of the drill is out of contact with the grinding wheel. The operator then exerts manual pressure on the drill holder axially of the drill compressing the spring 68 to move the guide sleeve 72 and collar 65 toward the grinding wheel, bringing the operative portion of the drill into abrading engagement with the surfaces 110 and 112 of the grinding wheel. The operator continues a reciprocatory movement of the drill and holder 95 to rapidly and successively move the drill extremity into and out of engagement with the grinding wheel. The operator continues this action until the end of the holder 95 abuts the bushing or sleeve 60 which limits the ultimate extent of movement of the drill into contact with the grinding wheel. When abrasion of the drill point ceases, the operator withdraws the drill D from the guide sleeve 72, backs off the locking screw 103, removes the ground drill and inserts another drill to be ground or sharpened. The locking screw 103 is again drawn into locking engagement with the succeeding drill and the above-described cycle of steps repeated.

In drilling openings in tiles, many drills are brought into simultaneous operation on a tile to perforate the same and it is usual to employ upwards of forty-eight or more drills at one setting of the drilling machine. In practice it is desirable to space the openings at about one-half inch between centers of adjacent openings. To obtain such relatively close spacing, adjacent drills may be spaced in the drilling machine at one inch between drill centers and one set or group of openings drilled in the tile. The tile may then be shifted to a position one-half inch removed from its former position and a second set or group of openings formed in the tile. This method enables the forming of many small openings, as for example openings of one-quarter inch in diameter, in the tile with the openings arranged in close relation.

As the group of drills is concomitantly used in drilling the tiles, the drills become worn at a substantially uniform rate and hence the worn drills are of approximately the same length. Thus only one setting of the abutment screw 99 is required to grind or resharpen the entire group of worn drills.

Through the method of grinding, the drills ground at one setting of the abutment member 99 are all of uniform length. As the drills become shortened through use and repeated grinding, the abutment screw 99 may be threaded inwardly to shift the initial position for each group of drills as they become worn. When the drills become quite short, the locking screw 103 may be inserted in one of the openings 103'.

Through the apparatus of the present invention, drills of the character shown in Figure 5 may be quickly and easily resharpened in a minimum amount of time, and any number of drills may be ground or sharpened to a uniform length. Furthermore, the fixture of the invention may be applied to conventional grinding machines without effecting changes in the machines.

It is apparent that, within the scope of the invention, modifications and different arrangements may be made other than is herein disclosed, and the present disclosure is illustrative merely, the invention comprehending all variations thereof.

What I claim is:

1. A tool-grinding apparatus including, in combination, a support; a fixture frame associated with the support and having a portion adjacent a grinding wheel, said portion having a bore formed therein; a tool-guiding member mounted for longitudinal slidable movement in said bore; a tool holder adapted to receive a tool to be ground, said member being formed with an opening to accommodate a portion of the tool projecting from the tool holder, and means associated with the member and tool holder for predetermining the position of the tool for engagement with the grinding wheel.

2. A tool-grinding apparatus including, in combination, a support; a pedestal mounted upon the support and adjustable relative thereto; a fixture frame mounted upon the pedestal and having a portion extending adjacent a grinding wheel, said extending portion having a bore formed therein; a tool guide mounted for longitudinal slidable movement in said bore; a tool holder adapted to receive a tool to be ground, said guide having an opening to accommodate a portion of the tool projecting from the tool holder, and abutment means associated with the guide for predetermining the extent of movement of the tool in its engagement with the grinding wheel.

3. A tool-grinding apparatus including, in combination, a support; a grinding wheel having a planar surface and a peripheral chamfered surface journaled on the support; a pedestal mounted upon the support and adjustable relative thereto; a fixture frame mounted upon the pedestal and having a portion extending adjacent a grinding wheel, said extending portion having a bore formed therein; a tool-guiding sleeve reciprocably mounted in said bore; a tool holder adapted to receive a tool to be ground, said sleeve having an axial opening to accommodate a portion of the tool projecting from the tool holder, and a transversely disposed pin carried by the sleeve and engageable with the tool to be ground for predetermining the position of the tool in its engagement with the grinding wheel, the grinding of the tool being effected upon the planar and chamfered surface zones of the grinding wheel.

4. Apparatus for grinding drills having off-center cutting configurations including a support; a member adjustably mounted upon the support and having a bore formed therein adjacent a grinding wheel; a drill-guiding sleeve slidably mounted in the bore; the central opening in the sleeve adapted to receive the body of the drill to be ground; a transversely extending pin associated with said guide sleeve adapted to extend into the spiral groove of the drill to predetermine the rotative position of the drill with respect to the grinding wheel; a holder arranged to receive the shank of the drill; means on said holder for predetermining the position of the drill in the holder, and means for limiting the axial movement of the drill into engagement with the grinding wheel.

5. Apparatus for grinding a spirally grooved drill having a body portion and off-center cutting configuration including a support; a member adjustably mounted upon the support and having a bore formed therein adjacent a grinding wheel; a drill-guiding sleeve slidably mounted in the bore; the central opening in the sleeve adapted to receive the spirally grooved portion of the drill to be ground; a projection associated with said drill guiding sleeve and adapted to extend into the spiral groove of the drill to determine the relative rotative position of the drill with respect to the grinding wheel; a holder arranged to receive the body portion of the drill; an adjustable abutment on said holder for predetermining the position of the drill in the holder, and abutment means associated with the drill guiding sleeve for limiting the axial movement of the drill into engagement with the grinding wheel.

6. Apparatus for grinding a spirally recessed drill having a body portion and an off-center cutting configuration including, in combination, a frame; a grinding wheel journaled on the frame; said grinding wheel being formed with a beveled grinding surface; a fixture supported upon the frame, said fixture having a boss portion disposed adjacent the grinding wheel; a bushing supported in a bore formed in the boss portion; a sleeve slidably supported in the bushing, said sleeve adapted to receive the spirally recessed portion of a drill to be ground; a drill holder adapted to receive the body portion of the drill to be ground; means on the drill holder for positioning the drill in the holder, and a projection associated with the sleeve and engageable in the spiral recess in the drill for guiding the drill into proper engagement with the grinding wheel, the axis of said sleeve being arranged to guide the drill into engagement with the grinding wheel whereby the off-center cutting configuration of the end of the drill is established by the beveled surface of the wheel.

7. Apparatus for grinding a spirally recessed drill having a shank portion and an off-center cutting configuration including, in combination, a frame; a grinding wheel journaled on the frame, said grinding wheel being formed with a uniplanar grinding surface and a beveled grinding surface; a fixture supported upon the frame and adjustable relative thereto, said fixture having a boss portion disposed adjacent the grinding wheel; a bushing supported in a bore formed in the boss portion; a sleeve slidably supported in said bushing, said sleeve adapted to receive the spirally recessed portion of a drill to be ground; a drill holder adapted to receive the shank portion of the drill to be ground; adjustable means on the drill holder for positioning the drill in the holder; means for locking the drill in the holder, and a projection associated with the sleeve and engageable in the spiral recess in the drill for guiding the drill into proper engagement with the grinding wheel, the axis of said sleeve being arranged to guide the drill into engagement with the grinding wheel whereby the off-center end configuration of the drill is established by the uniplanar and beveled surfaces of the wheel.

8. Apparatus for grinding a spirally recessed drill having a shank portion and a cutting configuration at one end including, in combination, a frame; a grinding wheel journaled on the frame; said grinding wheel being formed with a uniplanar grinding surface and a beveled grinding surface; a fixture supported upon the frame and adjustable relative thereto, said fixture having a boss portion disposed adjacent the grinding wheel; a bushing supported in a bore formed in the boss portion; a sleeve slidably supported in said bushing; resilient means for normally biasing the sleeve in a direction away from the grinding wheel, said sleeve adapted to receive the spirally recessed portion of a drill to be ground; a drill holder adapted to receive the shank portion of the drill to be ground; adjustable means on the drill holder for positioning the drill in the holder; means for locking the drill in the holder, and a projection associated with the sleeve and engageable in the spiral recess in the drill for guiding the drill into proper engagement with the grinding wheel, the axis of said sleeve being arranged to guide the drill into engagement with the grinding wheel whereby the end configuration of the drill is established by the uniplanar and beveled surfaces of the wheel.

References Cited in the file of this patent

UNITED STATES PATENTS

| | | |
|---|---|---|
| 635,999 | Gruber | Oct. 31, 1899 |
| 1,110,366 | Wincrantz | Sept. 15, 1914 |
| 1,323,452 | Cogsdill | Dec. 2, 1919 |
| 1,431,024 | Munthe | Oct. 3, 1922 |
| 1,710,647 | Probert et al. | Apr. 23, 1929 |
| 1,917,504 | Curtis | July 11, 1933 |
| 1,981,174 | Hille | Nov. 20, 1933 |
| 2,144,095 | Zwick | Jan. 17, 1939 |
| 2,199,773 | Armand | May 7, 1940 |
| 2,258,727 | Bannister | Oct. 14, 1941 |
| 2,275,483 | Parker | Mar. 10, 1942 |
| 2,352,489 | Melin | June 27, 1944 |
| 2,353,131 | Ford | July 11, 1944 |
| 2,371,676 | Coyne | Mar. 20, 1945 |
| 2,392,780 | Shugars | Jan. 8, 1946 |
| 2,421,358 | Sneva | May 27, 1947 |
| 2,494,825 | Melin | Jan. 17, 1950 |
| 2,600,548 | Lalime | June 17, 1952 |

FOREIGN PATENTS

| | | |
|---|---|---|
| 126,809 | Sweden | Dec. 4, 1946 |
| 584,896 | France | Nov. 29, 1924 |